(12) United States Patent
Anantharam et al.

(10) Patent No.: US 10,148,569 B2
(45) Date of Patent: *Dec. 4, 2018

(54) LAYER 2 PACKET SWITCHING WITHOUT LOOK-UP TABLE FOR ETHERNET SWITCHES

(71) Applicant: International Business Machines Corporation, Armonk, NY (US)

(72) Inventors: Sushma Anantharam, Cupertino, CA (US); Keshav G. Kamble, Fremont, CA (US); Dar-Ren Leu, San Jose, CA (US); Nilanjan Mukherjee, Santa Clara, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

This patent is subject to a terminal disclaimer.

(21) Appl. No.: 14/447,455

(22) Filed: Jul. 30, 2014

(65) Prior Publication Data

US 2014/0334498 A1 Nov. 13, 2014

Related U.S. Application Data

(63) Continuation of application No. 13/438,794, filed on Apr. 3, 2012, now Pat. No. 8,861,401.

(51) Int. Cl.
*H04L 12/741* (2013.01)
*H04L 12/935* (2013.01)
*H04L 29/12* (2006.01)

(52) U.S. Cl.
CPC ........ *H04L 45/745* (2013.01); *H04L 49/3009* (2013.01); *H04L 61/2038* (2013.01); *H04L 61/6022* (2013.01)

(58) Field of Classification Search
USPC .............................. 370/254, 395.32; 711/216
See application file for complete search history.

(56) References Cited

U.S. PATENT DOCUMENTS 6,661,787 B1 12/2003 O'Connell et al.
6,690,667 B1 * 2/2004 Warren .......................... 370/389
(Continued)

FOREIGN PATENT DOCUMENTS

CN 101252530 A 8/2008
CN 104221331 A 12/2014
(Continued)

OTHER PUBLICATIONS

Non-Final Office Action from U.S. Appl. No. 13/797,874, dated Aug. 26, 2014.
(Continued)

*Primary Examiner* — Hassan Kizou
*Assistant Examiner* — Abdullahi Ahmed
(74) *Attorney, Agent, or Firm* — Zilka-Kotab, P.C.

(57) ABSTRACT

In one embodiment, a system includes at least one processor and logic integrated with and/or executable by the at least one processor, the logic being configured to receive, by the at least one processor, a request to assign a media access control (MAC) address to a device on a port, determine, by the at least one processor, the MAC address to assign to the device based at least partially on the port, and send, by the at least one processor, a response to the request with the MAC address. According to a further embodiment, the logic may be configured to create a MAC address allocation table that includes a plurality of hash values, each hash value being associated with one port and a plurality of MAC addresses, wherein the assigned MAC address is one of the MAC addresses associated with the port in the MAC address allocation table.

20 Claims, 6 Drawing Sheets

(56) References Cited

U.S. PATENT DOCUMENTS

| | | | |
|---|---|---|---|
| 6,944,170 B2 | 9/2005 | Minkenberg | |
| 7,058,751 B2 | 6/2006 | Kawarai et al. | |
| 7,466,703 B1 | 12/2008 | Arunachalam et al. | |
| 7,522,589 B2 | 4/2009 | O'Neill et al. | |
| 7,529,851 B1 * | 5/2009 | Haley et al. | 709/245 |
| 7,620,048 B2 | 11/2009 | Bass et al. | |
| 7,720,055 B2 | 5/2010 | Kadambi et al. | |
| 7,724,747 B2 | 5/2010 | Jain et al. | |
| 7,746,854 B2 | 6/2010 | Ambe et al. | |
| 7,778,259 B1 | 8/2010 | Mahalingaiah | |
| 7,848,327 B2 * | 12/2010 | Jain et al. | 370/392 |
| 7,877,519 B2 | 1/2011 | Eldar | |
| 7,995,465 B2 * | 8/2011 | Abdulla et al. | 370/218 |
| 8,219,690 B2 | 7/2012 | Shigeta et al. | |
| 8,446,910 B2 | 5/2013 | Chen et al. | |
| 8,861,401 B2 * | 10/2014 | Anantharam et al. | 370/254 |
| 8,902,896 B2 | 12/2014 | Kamble et al. | |
| 9,444,734 B2 | 9/2016 | Kamble et al. | |
| 9,450,868 B2 | 9/2016 | Anantharam et al. | |
| 9,537,766 B2 | 1/2017 | Kamble et al. | |
| 2002/0052972 A1 | 5/2002 | Yim | |
| 2003/0133451 A1 | 7/2003 | Mahalingaiah | |
| 2004/0111494 A1 | 6/2004 | Kostic et al. | |
| 2004/0148487 A1 | 7/2004 | Mori et al. | |
| 2004/0170181 A1 | 9/2004 | Bogdon et al. | |
| 2005/0190697 A1 | 9/2005 | Dohi et al. | |
| 2007/0211653 A1 | 9/2007 | Mizukoshi | |
| 2007/0286073 A1 * | 12/2007 | Pullen et al. | 370/229 |
| 2008/0056246 A1 | 3/2008 | McGee et al. | |
| 2008/0144620 A1 | 6/2008 | Jain et al. | |
| 2008/0168120 A1 * | 7/2008 | Suzuyama | H04L 45/00 709/201 |
| 2008/0247396 A1 | 10/2008 | Hazard | |
| 2008/0247399 A1 | 10/2008 | Hazard | |
| 2008/0257399 A1 | 10/2008 | Wong et al. | |
| 2010/0118831 A1 | 5/2010 | Chen et al. | |
| 2010/0135219 A1 * | 6/2010 | Donaghey | 370/328 |
| 2010/0265824 A1 | 10/2010 | Chao et al. | |
| 2010/0322076 A1 | 12/2010 | Goel | |
| 2010/0322086 A1 | 12/2010 | Harris et al. | |
| 2011/0096781 A1 | 4/2011 | Aybay | |
| 2011/0292939 A1 | 12/2011 | Subramaian et al. | |
| 2012/0082062 A1 | 4/2012 | Mccormack | |
| 2012/0263048 A1 | 10/2012 | Chen et al. | |
| 2012/0320748 A1 | 12/2012 | Schmidtke et al. | |
| 2013/0258899 A1 | 10/2013 | Anantharam et al. | |
| 2013/0259048 A1 | 10/2013 | Anantharam et al. | |
| 2013/0272303 A1 | 10/2013 | Kamble et al. | |
| 2013/0272304 A1 | 10/2013 | Kamble et al. | |
| 2014/0362862 A1 | 12/2014 | Kamble et al. | |

FOREIGN PATENT DOCUMENTS

| | | | |
|---|---|---|---|
| DE | 112013001904 T5 | 12/2014 | |
| GB | 2515442 A | 12/2014 | |
| JP | 2005045442 | 2/2005 | |
| JP | 2006190141 | 7/2006 | |
| JP | 2010088055 | 4/2010 | |
| KR | 20140107173 A | 9/2014 | |
| WO | 2013150404 A1 | 10/2013 | |

OTHER PUBLICATIONS

U.S. Appl. No. 14/469,360, filed Aug. 26, 2014.
Non-Final Office Action from U.S. Appl. No. 13/438,794 dated Jul. 12, 2013.
Non-Final Office Action from U.S. Appl. No. 13/438,794 dated Dec. 2, 2013.
Notice of Allowance and Fee(s) Due from U.S. Appl. No. 13/438,794 dated Jun. 9, 2014.
Non-Final Office Action from U.S. Appl. No. 13/797,874 dated Dec. 2, 2013.
Notice of Allowance and Fee(s) Due from U.S. Appl. No. 13/448,265 dated Jul. 24, 2014.
Restriction/Election Requirement from U.S. Appl. No. 13/448,265 dated May 16, 2014.
U.S. Appl. No. 13/448,265, filed Apr. 16, 2012.
U.S. Appl. No. 13/779,553, filed Feb. 27, 2013.
U.S. Appl. No. 13/438,794, filed Apr. 3, 2012.
U.S. Appl. No. 13/797,874, filed Mar. 12, 2013.
Yao, Andrew, "Should Tables Be Sorted?", IPCOM000150654D, Apr. 18, 2007, Database entry Copyright (c) Software Patent Institute, ip.com Prior Art Database, pp. 1-37.
"Method and Apparatus for look-up-table coded symbol system to substitute white noise packet payload," IBM, IPCOM000029823D, Jul. 14, 2004, ip.com Prior Art Database, pp. 1-5.
Zseby, T. et al., "Sampling and Filtering Techniques for IP Packet Selection (RFS5475)," IPCOM000181400D, Mar. 1, 2009, Copyright (c) 2009 IETF Trust and the persons identified as the . . . , ip.com Prior Art Database, pp. 1-48.
International Search Report and Written Opinion from PCT application No. PCT/IB2013/052168 dated Jun. 18, 2013.
Final Office Action from U.S. Appl. No. 13/797,874, dated Oct. 29, 2015.
Notice of Allowance from U.S. Appl. No. 14/469,360, dated Aug. 22, 2016.
Restriction/Election Requirement from U.S. Appl. No. 13/779,553, dated Apr. 14, 2015.
Non-Final Office Action from U.S. Appl. No. 13/797,874, dated Apr. 20, 2015.
Non-Final Office Action from U.S. Appl. No. 13/779,553, dated Aug. 7, 2015.
Final Office Action from U.S. Appl. No. 13/779,553, dated Jan. 20, 2016.
Notice of Allowance from U.S. Appl. No. 13/797,874, dated Feb. 8, 2016.
Non-Final Office Action from U.S. Appl. No. 14/469,360, filed Feb. 16, 2016.
Notice of Allowance from U.S. Appl. No. 13/779,553, dated Apr. 20, 2016.
Notice of Allowance from U.S. Appl. No. 13/797,874, dated May 31, 2016.
Notice of Allowance from U.S. Appl. No. 13/779,553, dated Jun. 2, 2016.
Corrected Notice of Allowance from U.S. Appl. No. 13/797,874, dated Jul. 1, 2016.
Notice of Rejection from Japanese Application No. 2015-503962, dated May 30, 2017.
Office Action from Chinese Application No. 201380017811.6, dated Oct. 25, 2016.
Examination Report from European Application No. GB1419383.3, dated Jun. 28, 2018.

* cited by examiner

LAYER 2 PACKET SWITCHING WITHOUT LOOK-UP TABLE FOR ETHERNET SWITCHES

RELATED APPLICATIONS

This application is a continuation of copending U.S. patent application Ser. No. 13/438,794, filed Apr. 3, 2012; which is herein incorporated by reference.

BACKGROUND

The present invention relates to data center infrastructure, and more particularly, this invention relates to Ethernet switches capable of layer 2 packet switching without the use of a look-up table.

In packet-switched network switches, look-up is typically performed on a destination media access control (MAC) address or a destination internet protocol (IP) address to discover an actual destination port of a switching device for forwarding the packet. Most systems utilize a switching processor of some kind, such as an application specific integrated circuit (ASIC), for this determination. The switching processor maintains look-up tables for performing the look-up resolution, which in typical networks may be rather long, possibly having thousands of entries. The look-up tables are either stored on chip or stored external to the chip. In either case, the use of a look-up table adds significant logical complexity, space, and memory requirements on the chip. This additional complexity eventually adds more latency and makes the chip more expensive than is desired. Accordingly, it would be beneficial to be able to discover an actual destination port without the use of a look-up table.

SUMMARY

In one embodiment, a system includes at least one processor and logic integrated with and/or executable by the at least one processor, the logic being configured to receive, by the at least one processor, a request to assign a media access control (MAC) address to a device on a port, determine, by the at least one processor, the MAC address to assign to the device based at least partially on the port, and send, by the at least one processor, a response to the request with the MAC address.

In another embodiment, a computer program product for assigning a MAC address includes a computer readable storage medium having program instructions embodied therewith, the program instructions being readable and/or executable by at least one processor to cause the at least one processor to create, by the at least one processor, a MAC address allocation table, wherein the MAC address allocation table includes a plurality of hash values, each hash value being associated with a port corresponding to a plurality of MAC addresses, wherein applying a hashing algorithm to any one of the plurality of MAC addresses results in the associated hash value, determine, by the at least one processor and without using a look-up table, a MAC address to assign to a device, and send, by the at least one processor, the MAC address to the device.

According to another embodiment, a system includes at least one processor and logic integrated with and/or executable by the at least one processor, the logic being configured to create a MAC address allocation table, wherein the MAC address allocation table includes a plurality of hash values, each hash value being associated with one port and a plurality of MAC addresses, receive a request to assign a MAC address to a device on a port, determine the MAC address to assign to the device based at least partially on the port, and send a response to the request with the MAC address.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, a media access control (MAC) address may be determined for devices coupled to a switching system which adhere to a system, where each MAC address corresponds to a particular hash value when a hashing algorithm is applied thereto, such that each hash value corresponds to one port of the switching device, thereby simplifying and improving upon how MAC addresses are assigned to devices.

In one general embodiment, a system includes at least one processor which includes logic configured for receiving a request to assign a media access control (MAC) address to a device on a port, logic configured for determining the MAC address to assign to the device based at least partially on the port, and logic configured for sending a response to the request with the MAC address.

In another general embodiment, a computer program product for assigning a MAC address includes a computer readable storage medium having computer readable program code embodied therewith, the computer readable program code including computer readable program code configured for determining, without using a look-up table, a MAC address to assign to a device and computer readable program code configured for sending the MAC address to the device.

According to another general embodiment, a method for assigning a MAC address includes receiving a request from a device for a MAC address at a port of a switching device, determining a MAC address to assign to the device based at least partially on the port, and responding to the request with the MAC address.

In yet another general embodiment, a method for retrieving a MAC address includes sending a request for a MAC address to a MAC allocation server (MAAS), waiting a predetermined amount of time to receive a response to the request, the response including the MAC address, and using the MAC address when the response to the request is received within the predetermined amount of time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
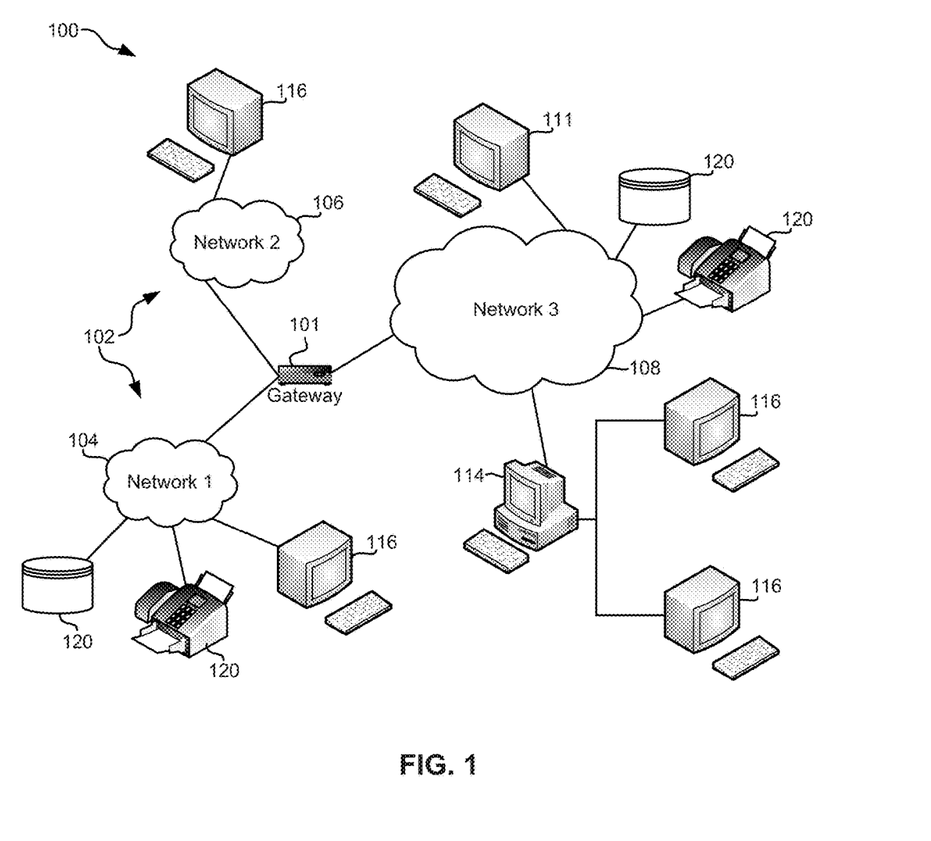
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
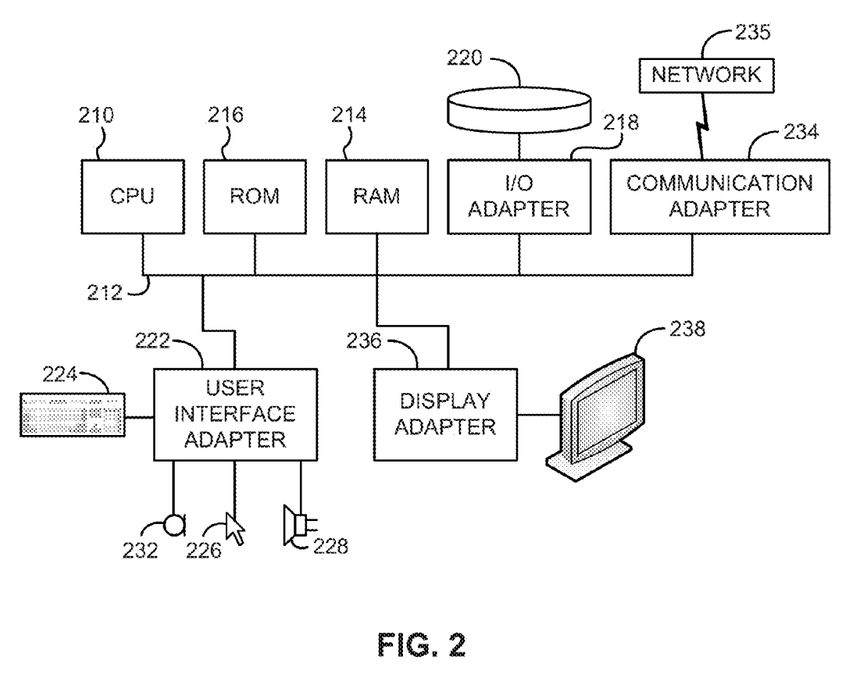
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Currently, IEEE assigns MAC addresses to organizations, such as businesses, educational institutions, etc., which are then free to assign the MAC addresses across their network(s) as they see fit. However, this process is inefficient and replete with latencies and problems. For example, in Ethernet switching, depending on the size of the MAC address table which stores all the learnt MAC addresses for a particular switching device, there may be a significant problem in scaling the switch for use in an expanding network, for processing capability for MAC address resolution and keeping lower lookup latency.

In order to overcome the problems and latencies associated with currently used MAC addressing protocols, instead of assigning fixed MAC addresses, the MAC addresses may be assigned upon boot-up of a switching device coupled to devices requiring MAC addresses. These MAC addresses may be determined based upon adherence to algorithmic allocation.

According to one embodiment, a destination port to which a received packet is switched may be a function of the destination MAC address, which may be written as Dest_Port=F(Dest_MAC_Address,is_mirror,is_flow), where F denotes a function, Dest_Port is the destination port, Dest_MAC_Address is the destination MAC address provided by the packet, is_mirror denotes that the packet is allowed to be mirrored to multiple ports or not, and is_flow denotes special operations and flow control. is_mirror and is_flow are not necessary for packet switching, but may be used where desired. In this way, MAC address allocation is performed more efficiently and with less overhead processing required as compared to conventional methods.

Figure 3:
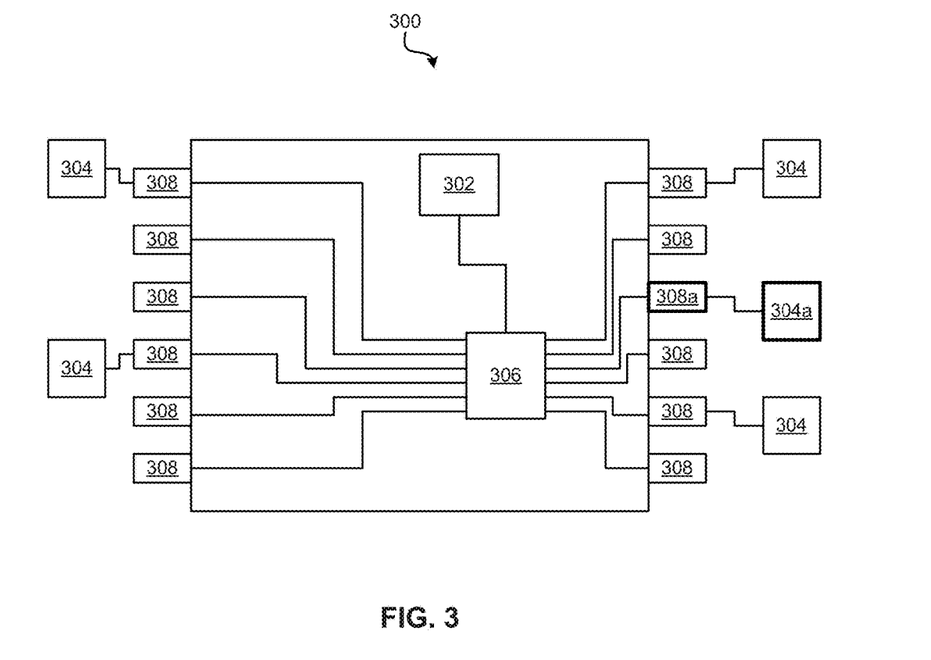
FIG. 3 is a simplified diagram of a switching device, according to one embodiment.

Referring now to FIG. 3, a system 300, such as a switching device, is shown according to one embodiment. As shown, the system 300 comprises a server, such as a MAAS, adapted for assigning and managing MAC addresses for devices 304 electrically coupled to the system 300. The server may be a component and/or managed by at least one processor 306, such as a switching processor for executing logic. In some embodiments, the system 300 may also comprise a local processor 302 for executing logic, which is electrically coupled to the at least one processor 306. Any type of processor known in the art may be used for the local processor 302 and/or the at least one processor 306, such as a central processing unit (CPU), a field programmable gate array (FPGA), an integrated circuit (IC), an application specific integrated circuit (ASIC), etc. In a further embodiment, both a switching ASIC and a local CPU may be included in the system 300, with the switching ASIC managing switching operations and the local CPU managing MAC address allocation operations.

Every new host, server, or device that comes online acquires a MAC address in order to communicate with other devices. This is unique from conventional methods where a network interface card (NIC) of the devices are pre-programmed with a MAC address. Conventionally, at boot-up, the device uses that MAC address to communicate. However, according to embodiments described herein, a method of MAC address acquisition using a MAC address acquisition algorithm or MAC Address Acquisition Protocol (MAAP) eliminates the need for pre-programmed MAC addresses, but may be used in addition to a preprogrammed MAC address, in some approaches.

According to one embodiment, the at least one processor 306 comprises or has access to logic configured for receiving a request to assign a MAC address to a device 304 on a port 308. The request may be sent by the device 304 or may originate elsewhere in the network or in the system 300. The port 308 on which the request is received is stored or otherwise remembered such that it may be used to send all outgoing traffic that is bound to the device 304 in the future. The at least one processor 306 further comprises or has access to logic configured for determining the MAC address to assign to the device based at least partially on the port and logic configured for sending a response to the request with the MAC address.

Figure 4:
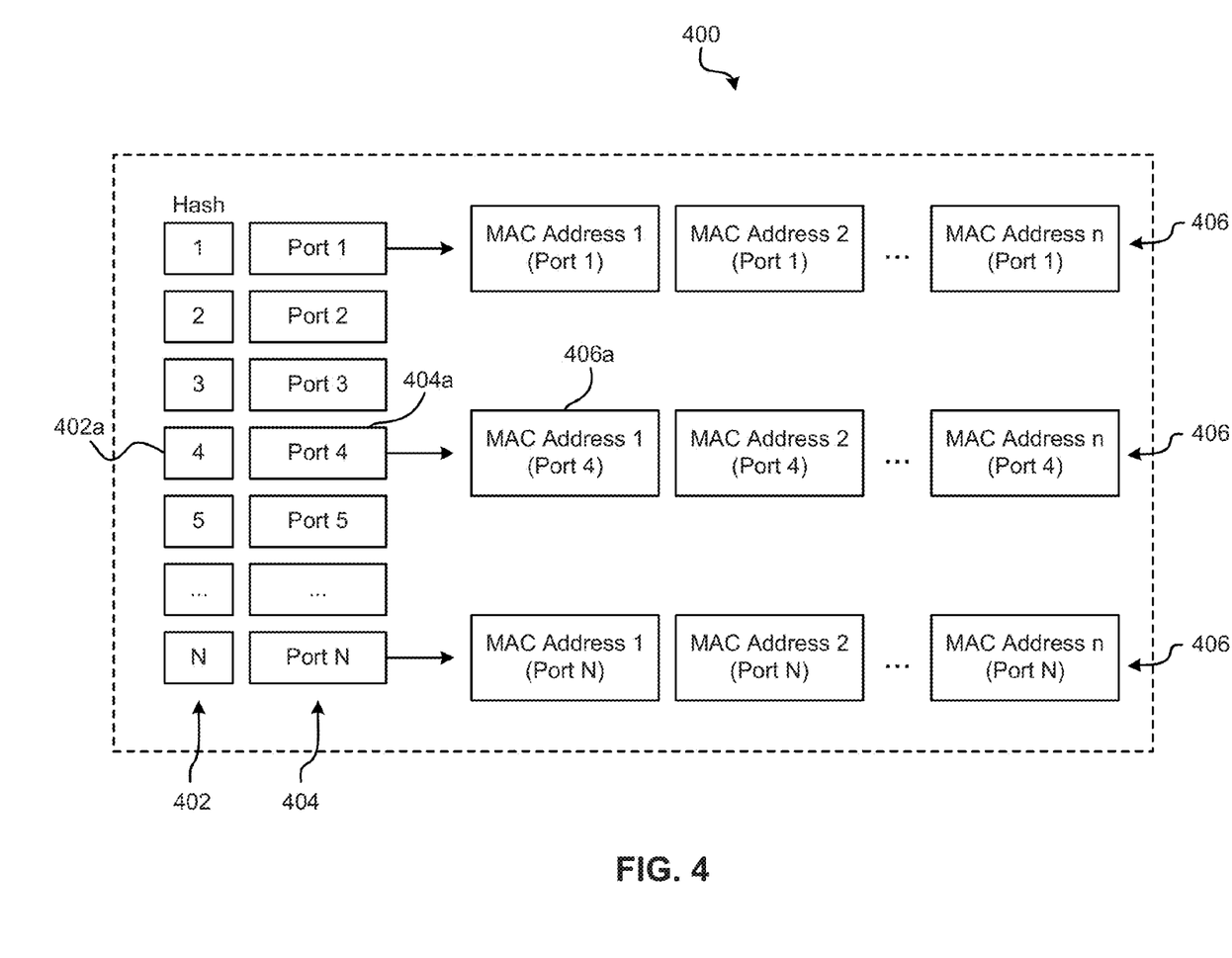
FIG. 4 shows a media access control (MAC) address allocation table, according to one embodiment.

In one embodiment, the at least one processor 306 may further comprise or have access to logic configured for creating a MAC address allocation table. Referring now to FIG. 4, the MAC address allocation table 400 may comprise a plurality of hash values 402, each hash value 402 being associated with one port 404 and a plurality of MAC addresses 406. In one approach, referring now to FIGS. 3-4, applying a hashing algorithm to any one of the plurality of MAC addresses 406 results in the associated hash value 402, such that there is a systematic method of assigning a MAC address 406 to a device 304 requesting the MAC address 406 which corresponds to the port 404 on which the device 304 is coupled to the system 300.

In one approach, the logic configured for determining the MAC address 406a to assign to the device 304a may comprise logic configured for choosing the MAC address 406a from the MAC address allocation table 400 such that applying the hashing algorithm to the chosen MAC address 406a results in a hash value 402a that is associated with the port 404a coupled to the device 304a.

In a further approach, the logic configured for choosing the MAC address 406a from the MAC address allocation table 400 comprises logic configured for sequentially or randomly choosing a next available MAC address 406a from a plurality of available MAC addresses 406, wherein an available MAC address is not currently assigned to a device 304. Of course, in the converse, an unavailable MAC address is currently assigned to a device 304.

In another further approach, the logic may further comprise, upon choosing the MAC address 406a from the MAC address allocation table 400, logic configured for marking the MAC address 406a as unavailable by removing the MAC address 406a from the MAC address allocation table 400 and adding the MAC address to a used MAC address table (not shown, but would be similar to the MAC address allocation table 400 except it would include only assigned MAC addresses). In more approaches, the logic may further comprise, upon the device 304a releasing the MAC address 406a assigned thereto, logic configured for marking the MAC address 406a as available by adding the MAC address 406a to the MAC address allocation table 400 and removing the MAC address 406a from the used MAC address table 400.

In another embodiment, the logic may be configured for flipping an indication bit associated with the MAC address 406a in the MAC address allocation table 400 to indicate that the MAC address 406a is available or unavailable.

According to various embodiments, the hashing algorithm may comprise any perfect or imperfect hashing algorithm, as known in the art. In one approach, the hashing algorithm may comprise: H(DM)=(DM[0]*1 XOR DM[1]*2 XOR DM[2]*3 XOR DM[3]*4 XOR DM[4]*5 XOR DM[5]*6) MOD P, wherein DM is the MAC address, H(DM) is the hash value of all six bytes of the MAC address DM, and P is a total number of physical ports 308 of the system 300.

In another embodiment, the hashing algorithm may comprise: H(DM)=(DM[0]*1 XOR DM[1]*2 . . . XOR DM[N−1]*N) MOD P, wherein DM is the MAC address, H(DM) is the hash value of the MAC address DM, DM[N−1] is a byte of the MAC address DM having N number of bytes, and P is a total number of physical ports.

According to another embodiment, the MAC address allocation table 400 may be created during a start-up process of the at least one processor 306. This start-up process may be the system 300 booting-up or any other process which occurs once to get components up to speed.

In another embodiment, the request may comprise a MAC address acquisition protocol (MAAP) packet having a source address. In this case, the response may include the received MAAP packet altered such that a destination address of the altered MAAP packet is changed to the source address of the received MAAP packet. In this way, the same MAAP packet may be used for the request and the response, with a simple switch between the source and destination addresses.

Figure 5:
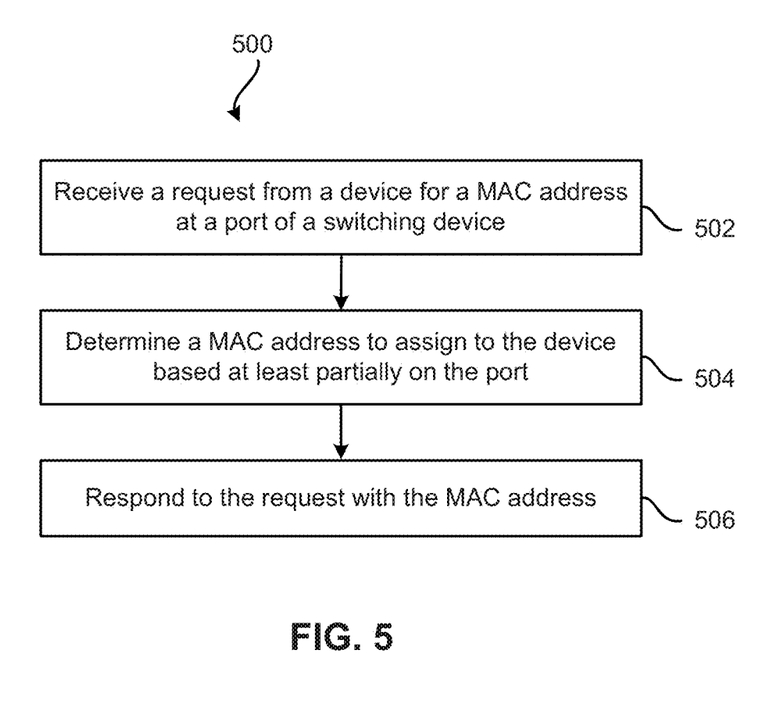
FIG. 5 is a flowchart of a method, according to one embodiment.

Now referring to FIG. 5, a flowchart of a method 500 for assigning a MAC address is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a switching device and/or a MAAS of a switching device.

As shown in FIG. 5, method 500 may initiate with operation 502, where a request is received from a device for a MAC address at a port of a switching device. As described herein, the port at which the request is received is stored for use in determining a MAC address for the device.

In operation 504, a MAC address to assign to the device is determined based at least partially on the port.

In one approach, a MAC address allocation table may be created. The MAC address allocation table may comprise a plurality of hash values, with each hash value being associated with a port corresponding to a plurality of MAC addresses. Furthermore, applying a hashing algorithm to any one of the plurality of MAC addresses results in the associated hash value, which in turn is associated with the port of the MAC address.

Furthermore, in one embodiment, a MAAS may use a pre-defined set of MAC addresses provided to the MAAS from an input file to build the MAC address allocation table. In this case, the MAAS determines the MAC address to assign to the device from the MAC address allocation table in response to receiving a MAC Address Allocation Protocol (MAAP) packet.

In one embodiment, the hashing algorithm may be a perfect hashing algorithm or an imperfect hashing algorithm. One such perfect hashing algorithm that may be used is: H(DM)=(DM[0]*1 XOR DM[1]*2 XOR DM[2]*3 XOR DM[3]*4 XOR DM[4]*5 XOR DM[5]*6) MOD P, where DM is the MAC address, H(DM) is the hash value of all six bytes of the MAC address DM, and P is a total number of physical ports of the switching device.

According to another embodiment, the hashing algorithm may comprise H(DM)=(DM[0]*1 XOR DM[1]*2 . . . XOR DM[N−1]*N) MOD P, wherein DM is the MAC address, H(DM) is the hash value of the MAC address DM, DM[N−1] is a byte of the MAC address DM having N number of bytes, and P is a total number of ports.

In some approaches, if a packet is received from a device and applying the hashing algorithm to the MAC address does not result in an appropriate port of the switching device, e.g., the destination MAC address was not provided by the MAAP, a regular lookup algorithm may be used to find the destination port. Then, the packet may be forwarded to the destination port. To identify MAC addresses not provided by the MAAS using MAAP, the MAC addresses may be compared for the range and universally unique identifier (UUID) fields. MAAP allocates MAC addresses within a certain preprogrammed range.

In one approach, the MAC address allocation table may be created during a start-up process of the switching device, such as during boot-up. Also, the MAC address allocation may be a list, association, file, or some other instrument which allows for a one or more MAC addresses to be associated with a single port and a single hash value.

In a further approach, the method 500 may further comprise choosing the MAC address from the MAC address allocation table such that applying the hashing algorithm to the chosen MAC address results in a hash value that is associated with the port of the switching device coupled to the device. For example, if the device is connected to port 4 of the switching device, then applying the hashing algorithm to the MAC address chosen for the device results in a hash value that is associated with port 4. The hash value may be 4, or it may be any other number that is associated with the port of the switching device prior to assignation of the MAC addresses which hash to that particular hash value.

In another further approach, the choosing the MAC address from the MAC address allocation table may comprise sequentially or randomly choosing a next available MAC address from a plurality of available MAC addresses. An available MAC address is a MAC address which is not currently assigned to a device, while an unavailable MAC address is a MAC address which is currently assigned to a device.

In another further embodiment, the method 500 may comprise marking the MAC address as unavailable or removing the MAC address from the MAC address allocation table and adding the MAC address to a used MAC address table upon choosing the MAC address from the MAC address allocation table. Furthermore, upon the device releasing the MAC address assigned thereto, the MAC address may be added to the MAC address allocation table and removed from the used MAC address table or the MAC address may be marked as available. Of course, both separate allocation tables and marking may be used in some further embodiments.

In another approach, the marking may include flipping an indication bit associated with the MAC address in the MAC address allocation table, or any other method of marking an entry in the table, as would be known in the art.

In operation 506, the request is responded to with the MAC address. Any response may be used that includes the MAC address, such as an Ethernet packet. In one such situation, the request may comprise a MAAP packet having a source address. In this case, the response may include the received MAAP packet altered such that a destination address of the altered MAAP packet is changed to the source address of the received MAAP packet. In this way, the same MAAP packet may be used for the request and the response, with a simple switch between the source and destination addresses.

According to one embodiment, at boot-up, a packet may be formed with D-MAC=01:00:5e:00:00:xx, S-MAC=NIC MAC address, and EtherType=0xFFFF or 0xXXXX where XX or xx are not yet defined but may be determined by a network administrator and given to a host operating system at configuration time. Therefore, these values may be any value which is known to both entities.

Then, the Ethernet packet (preferably a MAAP packet) is sent out on the connected NIC port to the MAAS, which may be a part of a switching device. Next, the switching device receives the packet on one of the ports of the switching device. Accordingly, the MAAP request packet along with the source port information is sent to the local MAAS. At this point, the local MAAS runs an address allocation algorithm and determines a MAC address H-MAC for the host operating system.

In one approach, the address allocation algorithm may comprise extracting the switch port number 'p' on which the MAAP request arrived and passing this port on to the MAAS using control software. Then, the MAC address allocation table is parsed through and a first available (un-allocated) MAC address is determined. This address is then added to the MAAP packet, and the address is marked as unavailable (allocated).

Next, the MAAS alters the MAAP packet by writing the H-MAC address in the MAAP packet and changing the destination address to the original source address of the original MAAP request. The packet is sent out of the source port. The requesting host operating system receives the response MAAP packet within a predetermined wait time (t_wait) and then starts using the H-MAC as its source MAC address for all further communication.

If the MAAP response does not arrive within the wait time (t_wait), the host operating system may retry the process two or more times. After the retries have received no response, the host operating system starts using the preprogrammed NIC MAC address as its source MAC address for all further communications.

According to most embodiments, the methods and systems described herein may be initialized on flat layer 2 networks where all the hosts, devices, or servers are assigned with IP addresses of the same subnet.

Figure 6:
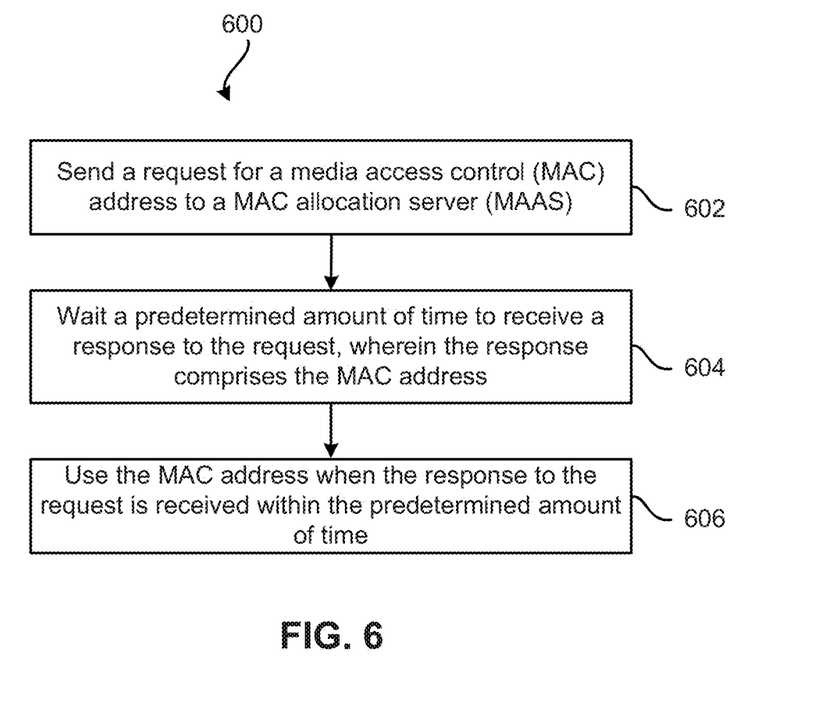
FIG. 6 is a flowchart of a method, according to another embodiment.

Now referring to FIG. 6, a flowchart of a method 600 for retrieving a MAC address, according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a switching device and/or a MAAS of a switching device.

As shown in FIG. 6, method 600 may initiate with operation 602, where a request for a MAC address is sent to a MAAS. The request may be a MAAP packet, in one approach.

In operation 604, a response to the request is waited for. If the response to the request is not received during a predetermined amount of time, other actions may be taken.

In operation 606, the MAC address is used when the response to the request is received within the predetermined amount of time. The response comprises the MAC address, and after receipt thereof, the MAC address is used, either by the device which sent the request initially, or some other device coupled to that device.

In one embodiment, a preprogrammed MAC address may be used by the device which sent the request for a MAC address when the response to the request is not received during the predetermined amount of time. This MAC address is preprogrammed into the device upon manufacture according to one approach.

According to embodiments and approaches presented herein, switching decisions may be taken without using a look-up table, since each device in the network has a MAC address which corresponds to a destination port of the switching device. Furthermore, this provides for an extremely fast switching algorithm and provides very low latency. It further cuts the cut-through latency drastically by simplifying switching logic and reduces cost.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising at least one processor and logic integrated with and/or executable by the at least one processor, the logic being configured to:
    receive, by the at least one processor, a request to assign a media access control (MAC) address to a device on a port;
    determine, by the at least one processor, the MAC address to assign to the device based at least partially on the port; and
    send, by the at least one processor, a response to the request with the MAC address.

2. The system as recited in claim 1, wherein the logic is configured to create, by the at least one processor, a MAC address allocation table,
    wherein the MAC address allocation table comprises a plurality of hash values, each hash value being associated with one port and a plurality of MAC addresses, wherein applying a hashing algorithm to any one of the plurality of MAC addresses results in the associated hash value.

3. The system as recited in claim 2, wherein the logic configured to determine the MAC address to assign to the device is configured to choose, by the at least one processor, the MAC address from the MAC address allocation table such that applying the hashing algorithm to the chosen MAC address results in a hash value that is associated with the port coupled to the device.

4. The system as recited in claim 3, wherein the logic configured to choose the MAC address from the MAC address allocation table is configured to sequentially or randomly choose, by the at least one processor, a next available MAC address from a plurality of available MAC addresses, wherein an available MAC address is not currently assigned to a device.

5. The system as recited in claim 4, wherein the logic is further configured to:
    upon choosing the MAC address from the MAC address allocation table, mark the MAC address as unavailable by removing the MAC address from the MAC address allocation table and adding the MAC address to a used MAC address table or flipping an indication bit associated with the MAC address in the MAC address allocation table; and
    upon the device releasing the MAC address assigned thereto, mark the MAC address as available by adding the MAC address to the MAC address allocation table and removing the MAC address from the used MAC address table or flipping the indication bit associated with the MAC address in the MAC address allocation table.

6. The system as recited in claim 3, wherein the hashing algorithm is: $H(DM)=(DM[0]*1 \text{ XOR } DM[1]*2 \text{ XOR } DM[2]*3 \text{ XOR } DM[3]*4 \text{ XOR } DM[4]*5 \text{ XOR } DM[5]*6) \text{ MOD } P$, wherein DM is the MAC address, H(DM) is the hash value of all six bytes of the MAC address DM, and P is a total number of ports of the system.

7. The system as recited in claim 2, wherein the MAC address allocation table is created during a start-up process of the at least one processor, and wherein the hashing algorithm comprises: $H(DM)=(DM[0]*1 \text{ XOR } DM[1]*2 \ldots \text{ XOR } DM[N-1]*N) \text{ MOD } P$, wherein DM is the MAC address, H(DM) is the hash value of the MAC address DM, $DM[N-1]$ is a byte of the MAC address DM having N number of bytes, and P is a total number of ports.

8. The system as recited in claim 1, wherein the request comprises a MAC address acquisition protocol (MAAP) packet having a source address, wherein the response comprises the received MAAP packet altered such that a destination address of the altered MAAP packet is changed to the source address of the received MAAP packet, and wherein the port is determinable from the MAC address.

9. A computer program product for assigning a media access control (MAC) address, the computer program product comprising a computer readable storage medium having program instructions embodied therewith, the program instructions being readable and/or executable by at least one processor to cause the at least one processor to:
    receive, by the at least one processor, a request to assign a MAC address to a device on a port;
    determine, by the at least one processor and without using a look-up table, a MAC address to assign to the device, wherein the port is determinable from the MAC address; and
    send, by the at least one processor, the MAC address to the device via the port.

10. The computer program product as recited in claim 9, wherein the program instructions are further configured to:
    create, by the at least one processor, a MAC address allocation table, wherein the MAC address allocation table comprises a plurality of hash values, each hash value being associated with a port corresponding to a plurality of MAC addresses, wherein applying a hashing algorithm to any one of the plurality of MAC addresses results in the associated hash value; and
    choose, by the at least one processor, the MAC address from the plurality of MAC addresses in the MAC address allocation table such that applying the hashing algorithm to the chosen MAC address results in a hash value that is associated with a port coupled to the device.

11. The computer program product as recited in claim 10, wherein the program instructions are further configured to, upon choosing the MAC address from the MAC address allocation table, mark, by the at least one processor, the MAC address as unavailable, or remove, by the at least one processor, the MAC address from the MAC address allocation table and add the MAC address to a used MAC address table, wherein an unavailable MAC address is currently assigned to a device.

12. The computer program product as recited in claim 11, wherein the program instructions are further configured to, upon the device releasing the MAC address assigned thereto:
- add, by the at least one processor, the MAC address to the MAC address allocation table and removing the MAC address from the used MAC address table; or
- mark, by the at least one processor, the MAC address as available.

13. The computer program product as recited in claim 12, wherein the program instructions configured to mark the MAC address as available is configured to flip, by the at least one processor, an indication bit associated with the MAC address in the MAC address allocation table.

14. The computer program product as recited in claim 10, wherein the MAC address allocation table is created during a start-up process, and wherein the hashing algorithm comprises: H(DM)=(DM[0]*1 XOR DM[1]*2 ... XOR DM[N−1]*N) MOD P, wherein DM is the MAC address, H(DM) is the hash value of the MAC address DM, DM[N−1] is a byte of the MAC address DM having N number of bytes, and P is a total number of ports.

15. A system, comprising at least one processor and logic integrated with and/or executable by the at least one processor, the logic being configured to:
- receive a request to assign a media access control (MAC) address to a device on a port;
- determine the MAC address to assign to the device based at least partially on the port, wherein the port is determinable from the MAC address; and
- send a response to the request with the MAC address to the device via the port.

16. The system as recited in claim 15, wherein the logic is further configured to create a MAC address allocation table, wherein the MAC address allocation table comprises a plurality of hash values, each hash value being associated with one port and a plurality of MAC addresses, wherein applying a hashing algorithm to any one of the plurality of MAC addresses results in the associated hash value, and wherein the logic configured to determine the MAC address to assign to the device is configured to choose the MAC address from the MAC address allocation table such that applying the hashing algorithm to the chosen MAC address results in a hash value that is associated with the port coupled to the device.

17. The system as recited in claim 16, wherein the logic configured to choose the MAC address from the MAC address allocation table is configured to sequentially or randomly choose a next available MAC address from a plurality of available MAC addresses, wherein an available MAC address is not currently assigned to a device.

18. The system as recited in claim 17, wherein the logic is further configured to:
- upon choosing the MAC address from the MAC address allocation table, mark the MAC address as unavailable by removing the MAC address from the MAC address allocation table and adding the MAC address to a used MAC address table or flipping an indication bit associated with the MAC address in the MAC address allocation table; and
- upon the device releasing the MAC address assigned thereto, mark the MAC address as available by adding the MAC address to the MAC address allocation table and removing the MAC address from the used MAC address table or flipping the indication bit associated with the MAC address in the MAC address allocation table.

19. The system as recited in claim 17, wherein the hashing algorithm is: H(DM)=(DM[0]*1 XOR DM[1]*2 XOR DM[2]*3 XOR DM[3]*4 XOR DM[4]*5 XOR DM[5]*6) MOD P, wherein DM is the MAC address, H(DM) is the hash value of all six bytes of the MAC address DM, and P is a total number of ports of the system.

20. The system as recited in claim 15, wherein the request comprises a MAC address acquisition protocol (MAAP) packet having a source address, and wherein the response comprises the received MAAP packet altered such that a destination address of the altered MAAP packet is changed to the source address of the received MAAP packet.

* * * * *